J. L. BALDWIN.
HOSE REEL.
APPLICATION FILED OCT. 12, 1915.

1,202,645.

Patented Oct. 24, 1916.

Inventor
Joseph L. Baldwin,
By Victor J. Evans
Attorney

Witnesses

UNITED STATES PATENT OFFICE.

JOSEPH L. BALDWIN, OF ATLANTA, GEORGIA.

HOSE-REEL.

1,202,645.   Specification of Letters Patent.   Patented Oct. 24, 1916.

Application filed October 12, 1915.   Serial No. 55,523.

*To all whom it may concern:*

Be it known that I, JOSEPH L. BALDWIN, a citizen of the United States, residing at Atlanta, in the county of Fulton and State of Georgia, have invented new and useful Improvements in Hose-Reels, of which the following is a specification.

This invention is an improved hose reel for use on a standpipe in a store or other buildings and on outside standpipes, and which is also adapted to be used on hydrants and the like, the object of the invention being to provide an improved device of this character which is cheap and simple, which may be readily installed, which serves to compactly arrange a hose out of the way and enable it to be unreeled readily when it is desired to use the same.

The invention consists in the construction, combination and arrangement of devices hereinafter described and claimed.

Figure 1:
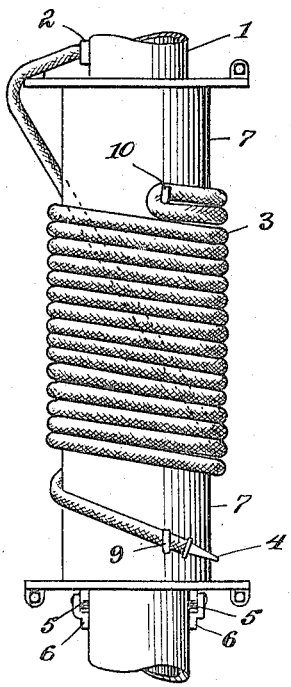
Figure 2:
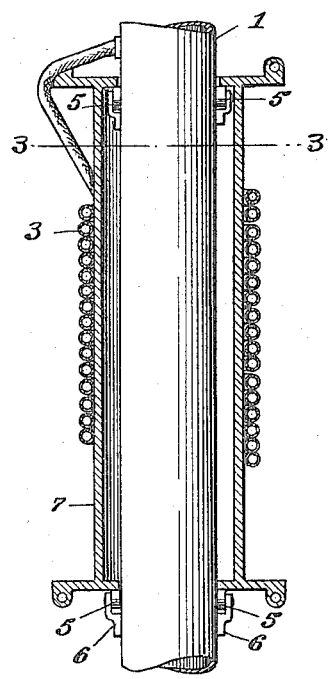
Figure 3:
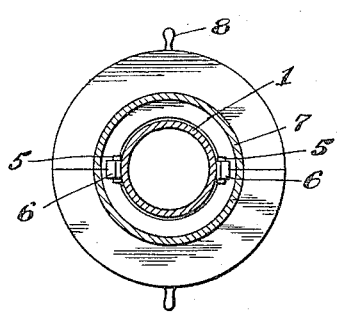
Figure 4:
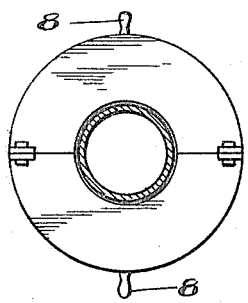

In the accompanying drawings, Figure 1 is a hose reel constructed in accordance with my invention, showing the same arranged on a standpipe. Fig. 2 is a sectional view of the same. Fig. 3 is a horizontal sectional view of the same. Fig. 4 is a plan of the same, with the standpipe shown in cross section.

For the purposes of this specification a standpipe is indicated at 1, provided with a hose connection 2, to which a hose 3 is attached, the hose being shown as provided with a nozzle 4 at its outer end.

The standpipe is provided with supporting wheels or rollers 5, which are mounted in bearings 6 and are arranged around the pipe and these rollers support a vertically arranged cylindrical drum 7 which is arranged around the standpipe, its lower end being engaged by the lower rollers and its upper end being engaged by the upper rollers so that the drum is adapted to be revolved freely on the standpipe. At either end of the drum are radially arranged handles 8 by means of which it may be readily turned. The drum is provided on one side, near its lower end, with a bracket hook 9.

The drum comprises a cylindrical central portion the least diameter of which exceeds that of the standpipe and also comprises the upper and lower heads, each of which has a central opening corresponding in diameter with that of the standpipe. A space is formed between the standpipe and the cylindrical portion of the drum in which the upper bearings 6 are arranged, so that the upper bearings are concealed. To enable the drum to be attached to and removed from the standpipe, the drum is made of a pair of semicylindrical sections which are detachably bolted together at the heads as shown.

By first looping the hose at a point about halfway between the coupler and the nozzle to the loop 10 and then turning the drum the hose may be readily reeled up on the drum as will be understood.

To unreel the hose it should first be disengaged at nozzle end from loop 9 and then drawn outwardly which will cause the drum to rapidly revolve and unwind the hose.

While I have herein shown my hose reel arranged on a standpipe I would have it understood that it may be used in connection with a hydrant or other like device.

Having thus described my invention, I claim:—

In combination with a standpipe or the like having a hose connection, bearings on said standpipe, rollers mounted in said bearings, and a drum comprising a cylindrical central portion of greater diameter than the standpipe and upper and lower heads on said cylindrical portion, said heads having openings through which the standpipe extends and the said rollers bearing against the under sides of said heads so that the drum is mounted for rotation around the standpipe.

In testimony whereof I affix my signature in presence of two witnesses.

JOSEPH L. BALDWIN.

Witnesses:
EDWARD BASMAJIAU,
FRED J. GAUDET.

Copies of this patent may be obtained for five cents each, by addressing the "Commissioner of Patents, Washington, D. C."